(12) United States Patent
Gekht et al.

(10) Patent No.: US 8,597,006 B2
(45) Date of Patent: Dec. 3, 2013

(54) APEX SEAL FOR ROTARY INTERNAL COMBUSTION ENGINE

(75) Inventors: Eugene Gekht, Brossard (CA); Jean Thomassin, Ste-Julie (CA); Sebastien Bolduc, Longueuil (CA); David Gagnon-Martin, Longueuil (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 231 days.

(21) Appl. No.: 13/273,891

(22) Filed: Oct. 14, 2011

(65) Prior Publication Data

US 2013/0028769 A1 Jan. 31, 2013

Related U.S. Application Data

(60) Provisional application No. 61/512,467, filed on Jul. 28, 2011.

(51) Int. Cl.
*F01C 19/00* (2006.01)
(52) U.S. Cl.
USPC .............. 418/113; 418/1; 418/121; 418/61.2; 418/140; 277/357
(58) Field of Classification Search
USPC ............ 418/113, 61.2, 143, 122, 112, 123, 1, 418/121, 140, 142, 61.1; 277/357
See application file for complete search history.

(56) References Cited

U.S. PATENT DOCUMENTS

| | | |
|---|---|---|
| 1,922,363 A | 8/1933 | Hapkins |
| 2,674,234 A | 4/1954 | Riggle |
| 3,064,880 A | 11/1962 | Wankel et al. |
| 3,142,440 A | 7/1964 | Schägg |
| 3,180,564 A | 4/1965 | Fuhrmann et al. |
| 3,193,188 A | 7/1965 | Bentele |
| 3,194,489 A | 7/1965 | Frenzel |
| 3,263,912 A | 8/1966 | Frenzel |
| 3,268,157 A | 8/1966 | Frenzel |
| 3,280,801 A * | 10/1966 | Scherenberg ................ 418/117 |
| 3,286,912 A | 11/1966 | Hiroshi |
| 3,556,695 A | 1/1971 | Yamamoto |
| 3,667,877 A | 6/1972 | Lamm |
| 3,685,922 A | 8/1972 | Lamm |
| 3,707,340 A | 12/1972 | Brille |

(Continued)

FOREIGN PATENT DOCUMENTS

| | | |
|---|---|---|
| DE | 3519186 | 12/1986 |
| EP | 2497902 | 9/2012 |

(Continued)

*Primary Examiner* — Theresa Trieu
*Assistant Examiner* — Thomas Olszewski
(74) *Attorney, Agent, or Firm* — Norton Rose Fulbright Canada

(57) ABSTRACT

In one aspect, there is described a rotor of a Wankel engine including a plurality of apex seal members each biased by a respective spring, each spring including an axial action portion and a radial action portion, the axial action portion including at least two radially extending band sections with adjacent ones of the band sections being connected by a fold, one of the band sections contacting a radially extending surface of the apex seal member and another of the band sections contacting a radially extending element of the rotor body, and the radial action portion forming a major part of a length of the spring, contacting an axially extending surface of the apex seal member in two spaced apart locations, and contacting the rotor body between the two spaced apart locations.

19 Claims, 6 Drawing Sheets

(56) References Cited

U.S. PATENT DOCUMENTS

| | | | |
|---|---|---|---|
| 3,761,207 A * | 9/1973 | Seidl | 418/121 |
| 3,771,501 A | 11/1973 | DeDobo | |
| 3,829,259 A | 8/1974 | Baynes | |
| 3,833,320 A | 9/1974 | Telang et al. | |
| 3,844,692 A | 10/1974 | McLain | |
| 3,849,037 A | 11/1974 | Downs | |
| 3,860,365 A | 1/1975 | Bibbens | |
| 3,876,346 A | 4/1975 | Kokochak | |
| 3,880,555 A | 4/1975 | Dega | |
| 3,884,600 A | 5/1975 | Gray | |
| 3,890,069 A | 6/1975 | Telang et al. | |
| 3,899,272 A | 8/1975 | Pratt | |
| 3,909,310 A | 9/1975 | Uy | |
| 3,915,600 A | 10/1975 | Lamm | |
| 3,920,359 A | 11/1975 | Gray | |
| 3,930,767 A | 1/1976 | Hart | |
| 3,931,977 A | 1/1976 | Goloff | |
| 3,932,075 A | 1/1976 | Jones | |
| 3,955,904 A | 5/1976 | Catterson | |
| 3,963,388 A | 6/1976 | Goloff | |
| 3,981,644 A | 9/1976 | Blum et al. | |
| 3,981,688 A | 9/1976 | Telang et al. | |
| 4,023,248 A * | 5/1977 | Ozeki et al. | 29/888.012 |
| 4,042,312 A | 8/1977 | Betts | |
| 4,058,321 A * | 11/1977 | Gavrun et al. | 277/357 |
| 4,072,449 A | 2/1978 | Staebler | |
| 4,104,011 A | 8/1978 | Ernest | |
| 4,317,648 A | 3/1982 | Shimizu et al. | |
| 4,437,822 A * | 3/1984 | Schwartz et al. | 418/122 |
| 5,144,802 A | 9/1992 | Ruzic | |
| 5,181,490 A | 1/1993 | Ruzic | |
| 5,410,998 A * | 5/1995 | Paul et al. | 123/204 |
| 7,097,436 B2 | 8/2006 | Wells | |
| 7,275,919 B2 | 10/2007 | Atkins | |
| 7,303,380 B1 | 12/2007 | Atkins | |
| 2010/0116241 A1 | 5/2010 | Mistry | |
| 2012/0227397 A1 | 9/2012 | Willi et al. | |

FOREIGN PATENT DOCUMENTS

| | | |
|---|---|---|
| JP | 54-055212 | 5/1979 |
| JP | 54-055213 | 5/1979 |
| JP | 55-081205 | 6/1980 |
| JP | 55-101703 | 8/1980 |
| JP | 2000-220401 | 8/2000 |

* cited by examiner

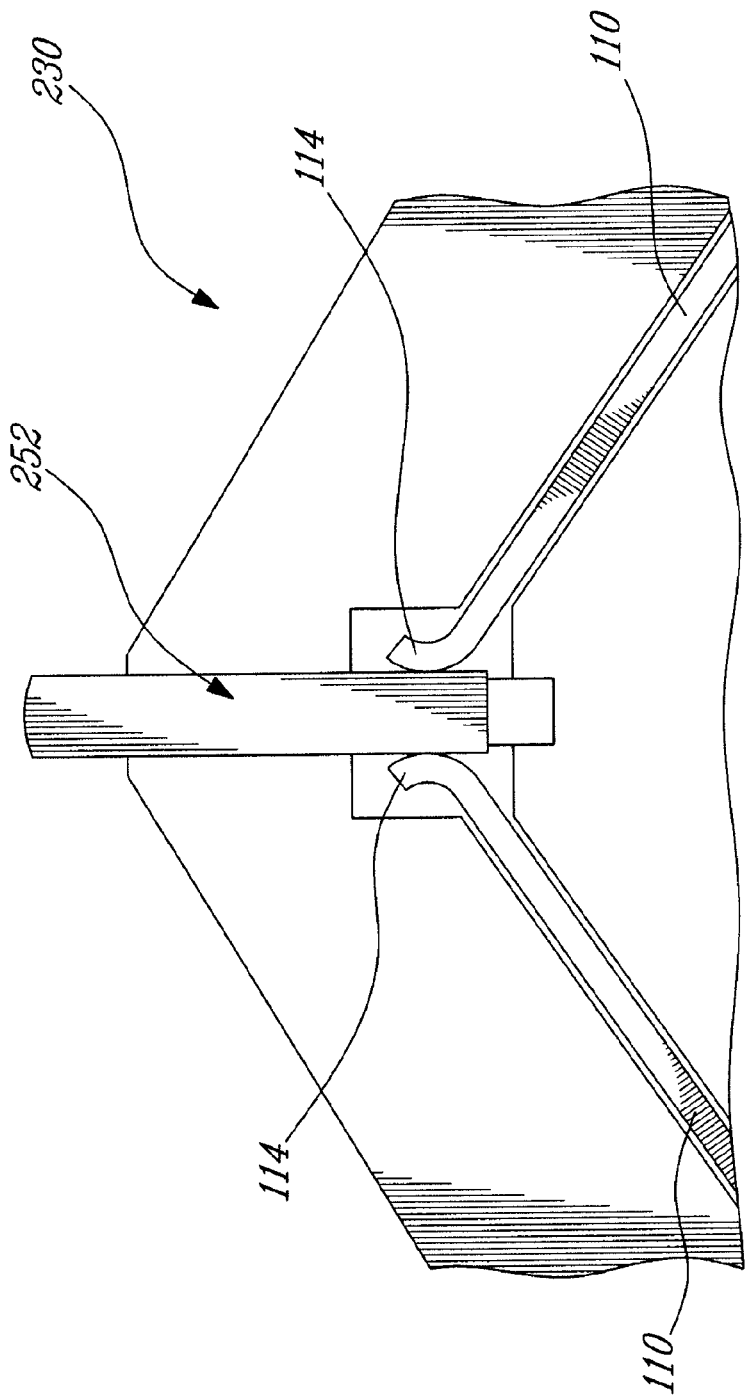

APEX SEAL FOR ROTARY INTERNAL COMBUSTION ENGINE

CROSS-REFERENCE TO RELATED APPLICATION

This application claims priority on provisional U.S. application No. 61/512,467 filed Jul. 28, 2011, the entire contents of which are incorporated by reference herein.

TECHNICAL FIELD

The application relates generally to an internal combustion engine using a rotary design to convert pressure into a rotating motion, more particularly, to a sealing arrangement for such an engine.

BACKGROUND OF THE ART

Rotary engines such as the ones known as Wankel engines use the eccentric rotation of a piston to convert pressure into a rotating motion, instead of using reciprocating pistons. In these engines, the rotor includes a number of apex portions which remain in contact with a peripheral wall of the rotor cavity of the engine throughout the rotational motion of the rotor.

The space around the rotor within the rotor cavity defines a number of working chambers which must be sealed from one another in order for the engine to work efficiently. Prior art sealing arrangements typically have gaps between some of the adjacent seal members, which may be due to manufacturing tolerances and/or differential thermal expansions of the seal elements and rotor.

SUMMARY

In one aspect, there is provided a rotor of a Wankel engine, the rotor comprising a rotor body having two axially spaced apart end faces, and a peripheral face extending between the end faces and defining three circumferentially spaced apex portions, and a plurality of apex seal members extending axially along a corresponding one of the apex portions, each apex seal member protruding radially from the peripheral face of the rotor, each apex seal member being biased by a respective spring, each spring being an integral band having first and second ends and including an axial action portion and a radial action portion distinct from one another and interconnected by a longitudinal portion, the axial action portion including the first end and at least two radially extending band sections with adjacent ones of the radially extending band sections being connected by a fold, one of the radially extending band sections contacting a radially extending surface of the apex seal member and another of the radially extending band sections contacting a radially extending element of the rotor body, and the radial action portion forming a major part of a length of the spring, the radial action portion including the second end and contacting an axially extending surface of the apex seal member in two spaced apart locations, and contacting the rotor body between the two spaced apart locations.

In another aspect, there is provided a spring for biasing a seal of a Wankel engine along axial and radial directions thereof, the spring comprising an axial action portion including a first end of the spring and at least two axially spaced apart radially extending band sections with adjacent ones of the radially extending band sections being connected by a fold, a longitudinal portion extending axially from the axial action portion opposite the first end and connected to one of the radially extending band sections by a fold, and a radial action portion extending from the longitudinal portion and forming a major part of a length of the spring, the radial action portion including: a first section extending from the longitudinal portion and contacting a first plane defined perpendicularly to the radial direction, a second section extending from the first section and contacting a second plane parallel to the first plane and radially offset therefrom, a third section extending from the second section, the third section being located between the first and second planes and extending without contacting the first and second planes at least when the spring is in a relaxed state, a fourth section extending from the third section and contacting the second plane, and a fifth section extending from the fourth section and contacting the first plane, the fifth section including the second end.

In a further aspect, there is provided a method of sealing chambers of a Wankel engine between apex portions of a rotor of the engine and a peripheral wall of a rotor cavity of a body of the engine, the method comprising, for each apex seal member extending from each of the apex portions of the rotor, radially pushing the apex seal member against the peripheral wall with a first section of a spring member, and axially pushing the apex seal member against one of two axially spaced apart end walls of the stator body with a second section of the same spring member distinct from the first section.

DESCRIPTION OF THE DRAWINGS

Reference is now made to the accompanying figures in which:

FIG. 6 is a schematic front view of an apex portion in accordance with an alternate embodiment.

DETAILED DESCRIPTION

Figure 1:
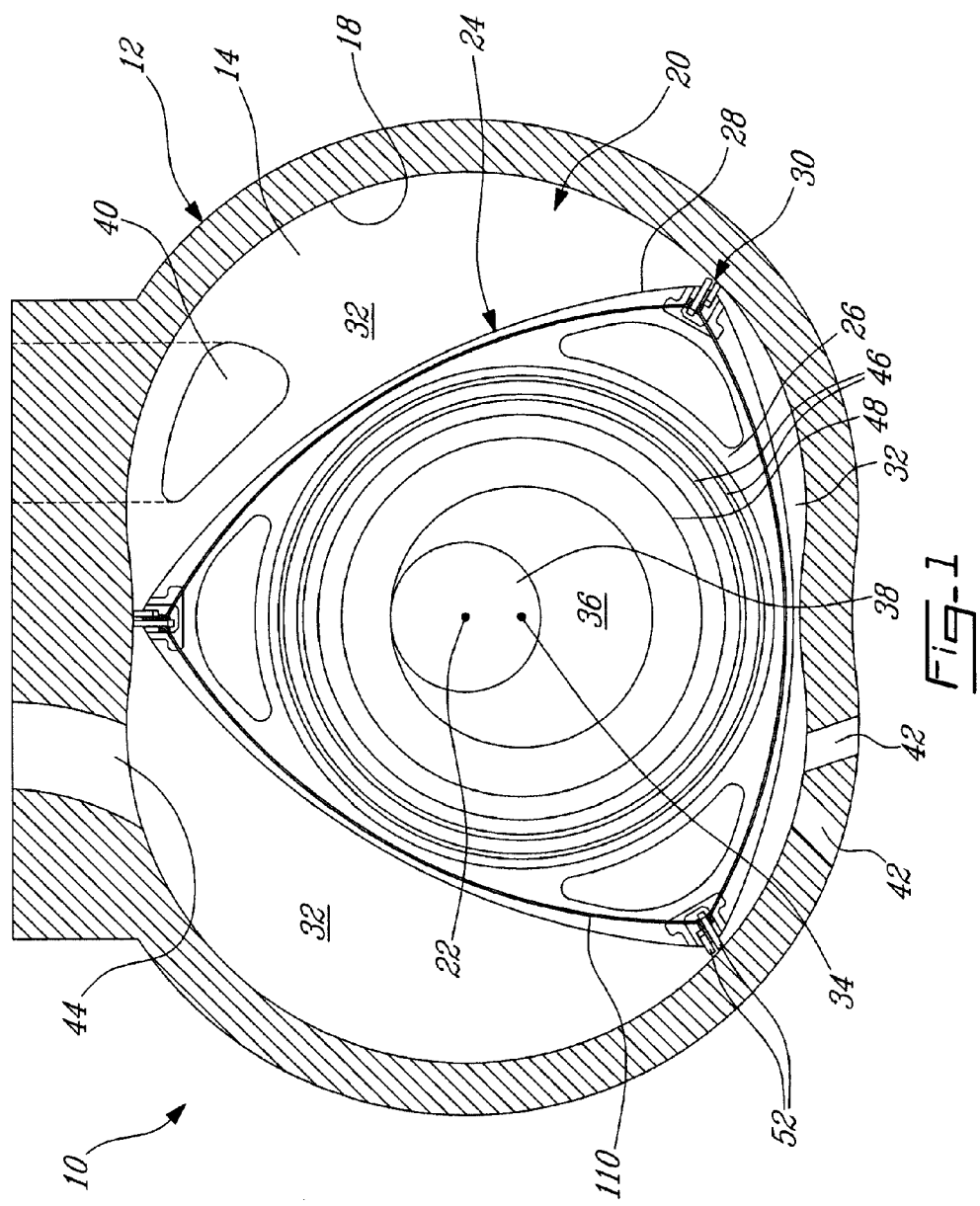
FIG. 1 is a schematic cross-sectional view of a rotary internal combustion engine having a rotor in accordance with one embodiment.

Referring to FIG. 1, a rotary internal combustion engine 10 known as a Wankel engine is schematically shown. The engine 10 comprises an outer body 12 having axially-spaced end walls 14 with a peripheral wall 18 extending therebetween to form a rotor cavity 20. The inner surface of the peripheral wall 18 of the cavity 20 has a profile defining two lobes, which is preferably an epitrochoid.

An inner body or rotor 24 is received within the cavity 20. The rotor 24 has axially spaced end faces 26 adjacent to the outer body end walls 14, and a peripheral face 28 extending therebetween. The peripheral face 28 defines three circumferentially-spaced apex portions 30, and a generally triangular profile with outwardly arched sides. As will be detailed further below, the apex portions 30 are in sealing engagement with the inner surface of peripheral wall 18 to form three working chambers 32 between the inner rotor 24 and outer body 12. The geometrical axis 34 of the rotor 24 is offset from and parallel to the axis 22 of the outer body 12.

In the embodiment shown, the outer body 12 is stationary while the rotor 24 is journaled on an eccentric portion 36 of a shaft 38, the shaft 38 being co-axial with the geometrical axis 22 of the cavity 20. Upon rotation of the rotor 24 relative to the outer body 12 the working chambers 32 vary in volume. An intake port 40 is provided through one of the end walls 14 for admitting air, or air and fuel, into one of the working chambers 32. Passages 42 for a spark plug or other ignition mechanism, as well as for one or more fuel injectors (not shown) are provided through the peripheral wall 18. An exhaust port 44 is also provided through the peripheral wall 18 for discharge of the exhaust gases from the working chambers 32. Alternately, the exhaust port 44 and/or the passages 42 may be provided through the end wall 14, and/or the intake port 40 may be provided through the peripheral wall 18.

During engine operation the working chambers 32 have a cycle of operation including the four phases of intake, compression, expansion and exhaust, these phases being similar to the strokes in a reciprocating-type internal combustion engine having a four-stroke cycle.

At least one oil seal ring 46 is disposed in a circular groove in each end face 26 of the rotor between the bearing 48 for the rotor 24 on the shaft eccentric 36 and the face seals. Each oil seal 46 impedes leakage flow of lubricating oil radially outwardly thereof between the respective rotor end face 26 and outer body end wall 14. Suitable springs (not shown) are provided for urging each oil seal 46 axially into contact with the adjacent end wall 14 of the outer body 12.

Figure 2:
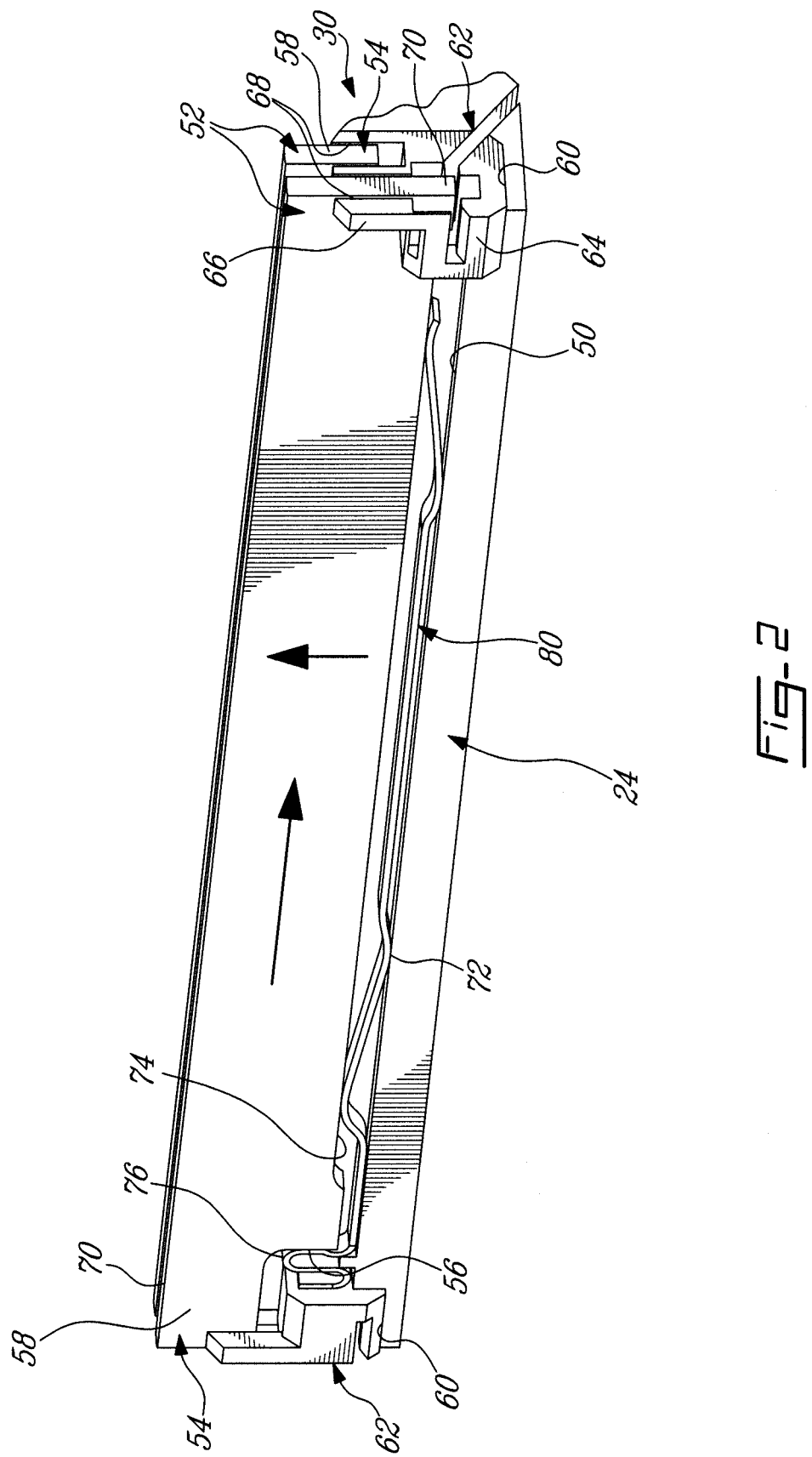
FIG. 2 is a schematic tridimensional view of part of an apex portion of the rotor of the engine of FIG. 1.
Figure 4:
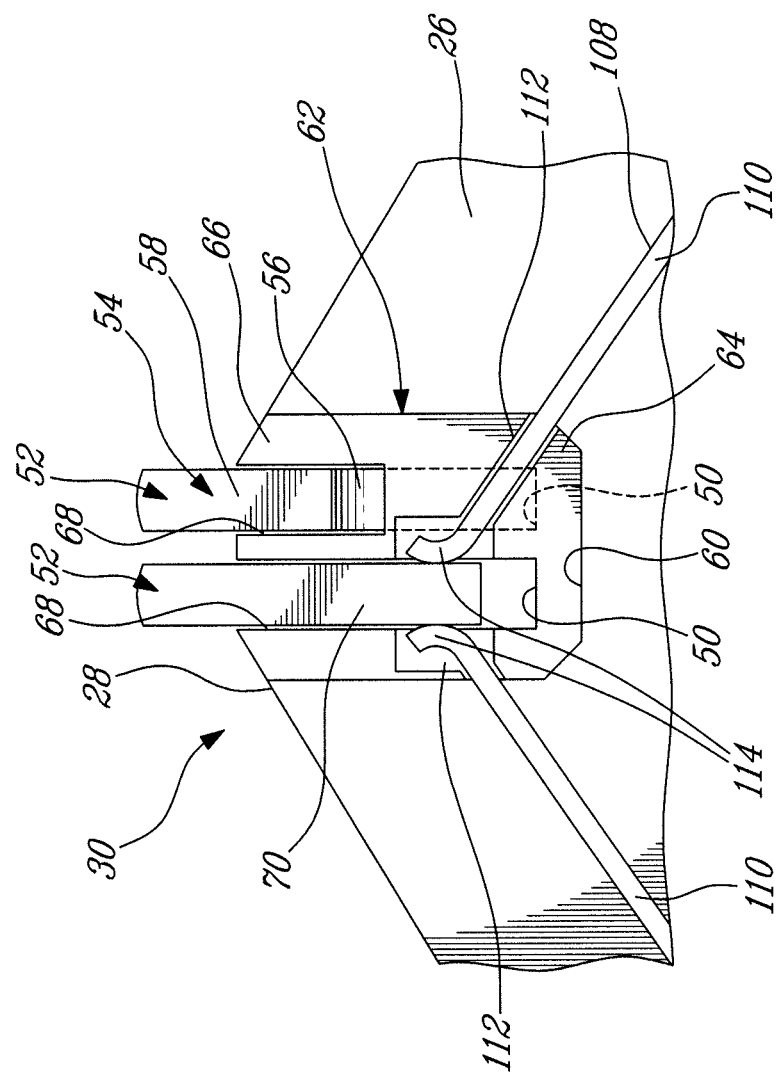
FIG. 4 is a schematic front view of the apex portion of FIG. 2.

The working chambers 32 are sealed by apex seals and face or gas seals. Referring particularly to FIGS. 2 and 4, each rotor apex portion 30 has two circumferentially spaced apart grooves 50 defined therein and extending radially inwardly into the rotor body 24, one on each side of the apex, from one end face 26 to the other. An apex seal 52 is received within each one of the grooves 50, and protrudes radially from the peripheral face 28. Each apex seal 52 in the embodiment shown extends axially beyond both end faces 26, and has an axial dimension which is close to a distance between the two end walls 14 of the cavity 20, taking into consideration such things as the difference in thermal expansion between the material(s) of the outer body 12 and the material of the apex seal 52, which in a particular embodiment is made of a suitable type of ceramic. Although each apex seal 52 is shown has monolithic and including a single seal member, alternately each apex seal may be composed of two or more cooperating seal members.

As shown, each apex seal 52 has a substantially rectangular shape, with a first end 54 having an indentation defined therein from an inner surface thereof. The indentation thus defines a radially extending surface 56 spaced from the first end 54, and the first end defines a finger 58 protruding from that surface 56. The fingers 58 of the two apex seals 52 of the same apex portion 30 are located axially opposite one another.

At each apex portion 30, each end face 26 includes a recess 60 in communication with both grooves 50, and an end plate 62 is received therein and extends radially therefrom. As such, each apex portion 30 includes two axially spaced apart end plates 62. As can be best seen in FIG. 2, each end plate 62 includes a thicker base 64 and a plate member 66 extending radially outwardly from the base 64, with the base 64 and plate member 66 forming a continuous outer surface extending continuously with the corresponding rotor end face 26. Each end plate 62 includes two radial slots 68 defined through the plate member 66 and part of the base 64, each slot 68 being in alignment with a respective one of the grooves 50 (see FIG. 4). Each apex seal 52 has its finger 58 received in the aligned slot 68 of one of the end plates 62, and the opposed second end 70 received in the respective slot 68 of the other end plate 62, such that each of the plates 62 receives one finger 58 and one second end 70. Alternately, the end plates 62 can be replaced by an integral part of the rotor body defining the plate members 66 and slots 68.

Referring to FIG. 2, each groove 50 receives a first biasing member 72, located between the inner surface 74 of the corresponding apex seal 52 and the rotor body 24. The first biasing member 72 pushes the apex seal 52 radially outwardly away from the peripheral face 28 of the rotor 24 and against the peripheral wall 18 of the cavity 20.

Figure 3:
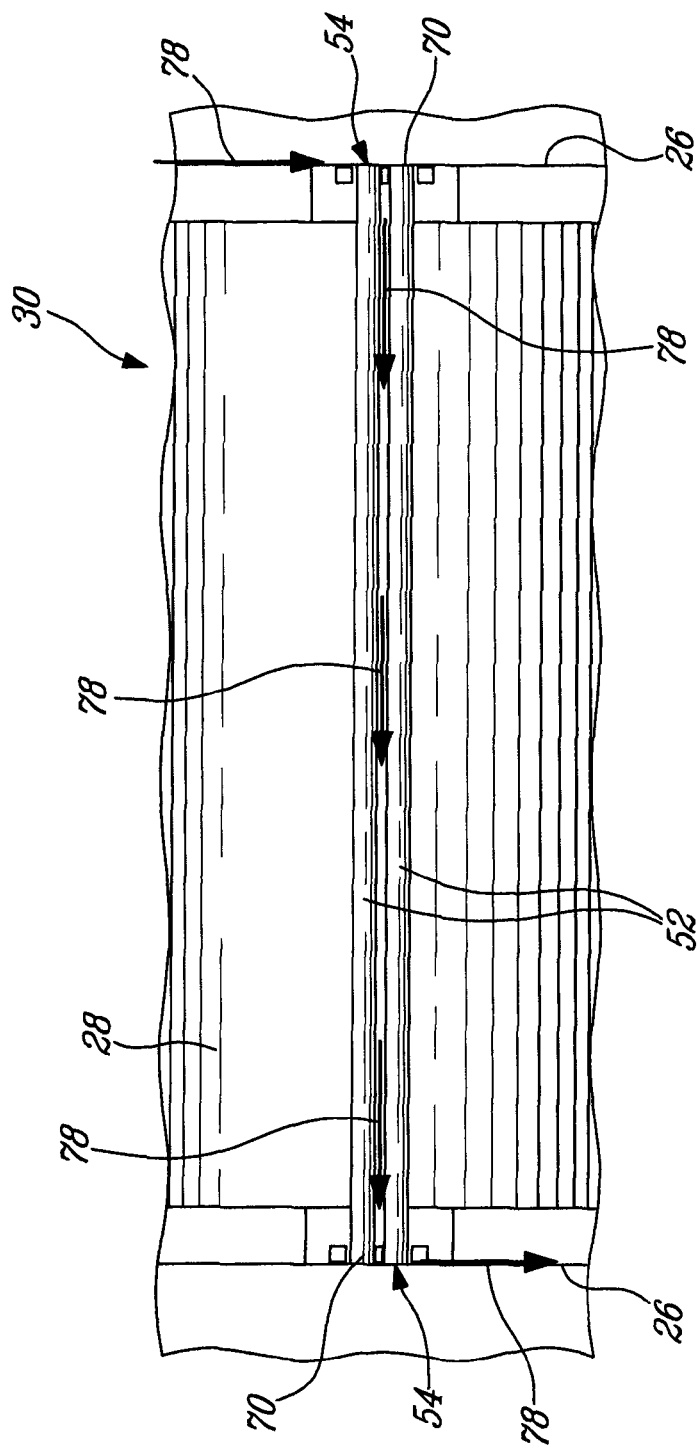
FIG. 3 is a schematic top view of the apex portion of FIG. 2.

Each groove 50 also receives a second biasing member 76 located at the first end 54 of the respective apex seal 52, between the plate member 66 of the adjacent end plate 62 and the radially extending surface 56 defined under the finger 58, pushing the apex seal 52 axially away from that adjacent end plate 62 and thus axially outwardly away from the opposite end face 26 of the rotor 24. The two second biasing members 76 of the same apex portion 30 are in contact with different ones of the end plates 62, and the two apex seals 52 are biased in axially opposite directions, each one against a respective one of the end walls 14. At each apex portion 30, each end wall 14 therefore has one of the apex seals 52 in contact therewith, and the other of the apex seals 52 in close proximity therewith, such as to create a tortuous potential leakage path 78 shown in FIG. 3 which necessitate the escaping flow to travel axially between the two apex seals 52 along the entire apex portion, and as such may help limit fluid communication at the junction between the peripheral wall 18 and each of the end walls 14.

In the embodiment shown, the first and second biasing members 72, 76 for each apex seal 52 correspond to, respectively, a radial action portion and an axial action portion of a same spring 80, the two portions 72, 76 being distinct from one another. Each apex seal 52 is biased independently from the other through its own spring 80.

Figure 5:
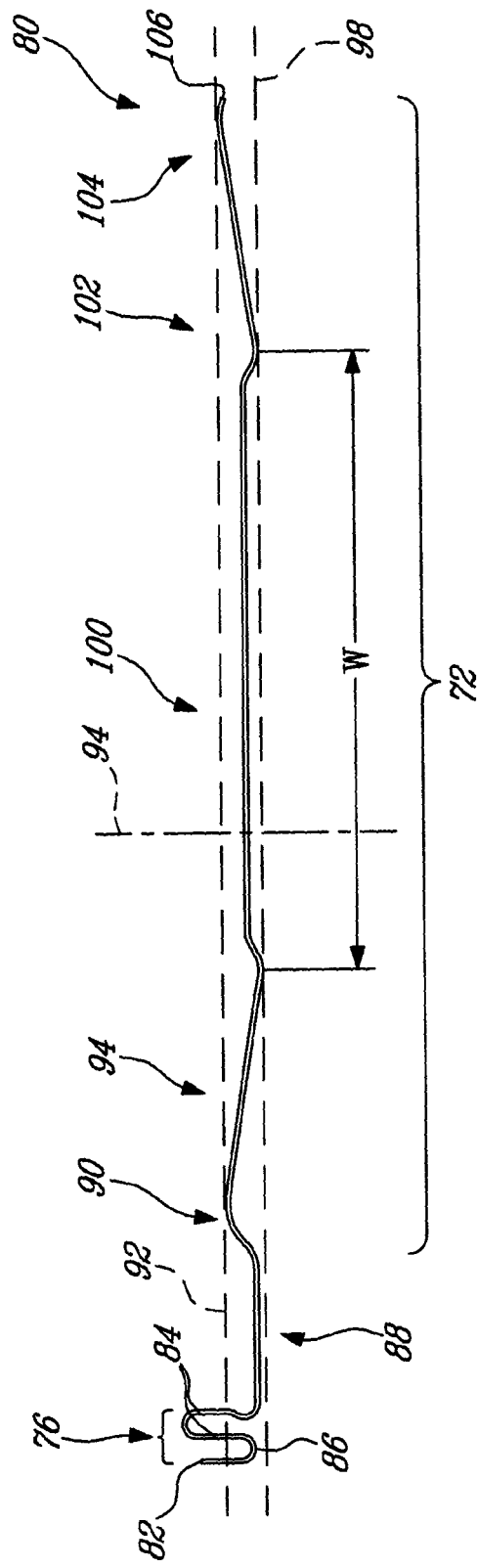
FIG. 5 is a schematic tridimensional view of a spring energizing one of the apex seals of the apex portion of FIG. 2.

Referring to FIG. 5, the spring 80 according to a particular embodiment is shown in isolation. The axial action portion 76 includes a first end 82 of the spring 80 and at least two band sections 84 with adjacent band sections 84 being interconnected by a fold 86. In the embodiment shown, the axial action portion 76 includes three band sections 84. The band sections 84 extend radially and are axially spaced apart from one another. One of the band sections 84 contacts the radially extending surface 56 (see FIG. 2) of the apex seal 52 and another of the band sections 84 contacts a radially extending element of the rotor body, which in the embodiment shown is plate member 66 (see FIG. 2). In a particular embodiment, the axial action portion 76 defines about 5% to 10% of the length of the spring.

The spring 80 is a monolithic band which also includes a longitudinal portion 88 extending axially between the axial action portion 76 and the radial action portion 72. The longitudinal portion 88 is thus connected to the adjacent band section 84 through a fold 86.

The radial action portion 72 forms a major part of the length of the spring 80. The radial action portion 72 contacts the axially extending inner surface 74 of the apex seal 52 (see FIG. 2) in two spaced apart locations, and contacts the bottom surface of the groove 50 between these two locations. In the embodiment shown, the spring includes five successive sections. The first section 90 extends from the longitudinal portion 88 and contacts a first plane 92 defined perpendicularly to the radial direction 94, this first plane 92 corresponding to the inner surface 74 of the apex seal 52. The second section 96 extends from the first section 90 and contacts a second plane 98 parallel to the first plane 92 and radially offset therefrom, which corresponds to the bottom surface of the groove 50. The third section 100 extends axially from the second section 96, and is located between the two planes 92, 98. At least when the spring 80 is in a relaxed state, and in a particular embodiment also when the spring 80 is in a compressed state, the third section 100 extends without contacting the planes 92, 98, i.e. without contacting the apex seal 52 and bottom surface of the groove 50. The fourth section 102 extends from the third section 100 and contacts the second plane 98 or bottom surface of the groove 50. The fifth section 104 extends from the fourth section 102 and contacts the first plane 92 or inner surface 74 of the apex seal 52, and includes the second end 106 of the spring 80.

A distance between the two spaced apart points of contact of the spring 80 with the bottom surface of the groove 50, or between the mid-points of the contact zones if the contact is done along an elongated portion of the surface, defines the wheel base W of the spring. In a particular embodiment, the wheel base W extends along between 55% and 75% of a total length of the radial action portion 72.

In a particular embodiment, the second end 106 of the spring 80 is curved, so that the portions of the spring 80 contacting the apex seal 52 are round to minimize sharp edge contact with the apex seal 52 and as such reduce the risk of damage to the apex seal 52, particularly in cases where the apex seal 52 is made of ceramic. In a particular embodiment, the spring 80 is made of a suitable metal, for example low alloy steel, stainless steel, Ti alloys, and if necessary of a suitable type of super alloy such as, for example, A-286 or Inconell 750.

It can be seen that the axial action portion 76 intersects the first plane 92, in order to extend into the indentation forming the radially extending surface 56 of the apex seal 52.

Referring back to FIG. 4, each end face 26 of the rotor 24 has a plurality of grooves 108 defined therein running from each apex portion 30 to each adjacent apex portion 30, with a face seal 110 being received within each groove 108. In a particular embodiment, each face seal 110 is monolithic. Each end face groove 108 and corresponding face seal 110 are arc-shaped and disposed adjacent to but inwardly of the rotor periphery throughout their length. A spring (not shown) located behind each face seal 110 urges it axially outwardly so that the face seal 110 projects axially away from the adjacent rotor end face 26 into sealing engagement with the adjacent end wall 14 of the cavity.

Each end plate 62 has two openings 112 defined therethrough in continuity with adjacent ones of the grooves 108 of the corresponding end face 26, and each opening 112 receives therein the end of one of the face seals 110. The two ends 114 of each face seal 110 are curled radially outwardly and abut a respective one of the apex seals 52, more particularly the apex seal 52 of each apex portion 30 which is biased against the same one of the end walls 14 as the face seal 110. The ends 114 are curled such as to be able to contact the apex seal 52 without the pointed extremity of the face seal 110 contacting the apex seal 52. The curled ends 114 may reduce the risk of damage to the apex seal 52, particularly in cases where the apex seal 52 is made of ceramic and the face seal 110 is made of metal.

As such, in each apex portion 30, the second end 70 of the apex seal 52 which is biased against a first one of the end walls 14 extends between and is in contact with the curled ends 114 of the two adjacent face seals 110 which are biased against that first end wall 14, and the second end 70 of the apex seal 52 which is biased against the second end wall 14 extends between and is in contact with the curled ends 114 of the two adjacent face seals 110 which are biased against that second end wall 14.

The apex seals 52 limit fluid communication along the peripheral wall 18, and the face seals 110 and apex seals 52 directly cooperate to provide a continuous contact area in sealing engagement with each end wall 14 of the cavity 20. This seal contact area encircles the rotor axis and provides a seal adjacent to the rotor periphery against inward flow of combustion gases between the rotor end faces 26 and the end walls 14. The apex seals 52 and face seals 110 directly cooperate to limit fluid communication along the end walls 14 and near the junction between each end wall 14 and the peripheral wall 18, without the need for an intermediary seal as is typically seen in the art. The elimination of the intermediary seal, seal plug and associated spring may advantageously reduce the number of elements necessary to obtain the desired seal.

Referring to FIG. 6, a sealing assembly according to another embodiment is shown. Here a single apex seal is provided at each of the apex portions 230. The single apex seal includes at least two portions 252 which are biased away from one another such as to contact the opposite end walls 14 of the cavity. Similarly to the previously described embodiment, the curved end 114 of the two face seals 110 extending into each apex portion 230 abut the corresponding sealing element or portion of the apex seal 252 on opposites sides thereof, such as to cooperate to limit fluid communication along the end walls 14 and near the junction between each end wall 14 and the peripheral wall 18.

In another embodiment with is not shown, each apex portion includes more than two circumferentially spaced apart apex seals, with at least one being biased against each of the end walls 14.

The above description is meant to be exemplary only, and one skilled in the art will recognize that changes may be made to the embodiments described without departing from the scope of the invention disclosed. For example, the biasing members need not be springs, per se, but rather any suitable apparatus having the functions described. The configuration of the springs shown are but one example of many possible configurations having the function(s) described. The multiple apex seals at each apex need not be identically configured, but may have any suitable individual configuration. Therefore, modifications which fall within the scope of the present invention will be apparent to those skilled in the art, in light of a review of this disclosure, and such modifications are intended to fall within the appended claims.

The invention claimed is:

1. A rotor of a Wankel engine, the rotor comprising:
   a rotor body having two axially spaced apart end faces, and a peripheral face extending between the end faces and defining three circumferentially spaced apex portions; and
   a plurality of apex seal members extending axially along a corresponding one of the apex portions, each apex seal member protruding radially from the peripheral face of the rotor;
   each apex seal member being biased by a respective spring, each spring being an integral band having first and second ends and including an axial action portion and a radial action portion distinct from one another and interconnected by a longitudinal portion,
   the axial action portion including the first end and at least two radially extending band sections with adjacent ones of the radially extending band sections being connected by a fold, one of the radially extending band sections contacting a radially extending surface of the apex seal member and another of the radially extending band sections contacting a radially extending element of the rotor body, and the radial action portion forming a major part of a length of the spring, the radial action portion including the second end and contacting an axially extending surface of the apex seal member in two spaced apart locations, and contacting the rotor body between the two spaced apart locations.

2. The rotor as defined in claim 1, wherein the radial action portion contacts an axially extending surface of the rotor body between the two spaced apart locations along only two spaced apart points of contact at least when the spring is in a relaxed state.

3. The rotor as defined in claim 2, wherein the radial action includes:
   a first section extending from the longitudinal portion and contacting the axially extending surface of the apex seal member at one of the locations,
   a second section extending from the first section and defining one of the points of contact with the axially extending surface of the rotor body,
   a third section extending longitudinally from the second section without contacting the rotor body and apex seal member at least when the spring is in the relaxed state,
   a fourth section extending from the third section and defining the other of the points of contact with the axially extending surface of the rotor body, and
   a fifth section extending from the fourth section and being in contact with the axially extending surface of the apex seal member at the other of the locations, the fifth section including the second end.

4. The rotor as defined in claim 1, wherein each apex portion includes two circumferentially spaced apart apex seal members each protruding axially from both end faces, the springs of the two apex seal members being disposed with the axial action portions thereof axially opposite one another and biasing the two apex seal members in opposite axial directions.

5. The rotor as defined in claim 1, wherein a rounded section of the radial action portion contacts the apex seal member in each of the locations.

6. The rotor as defined in claim 1, wherein the at least two radially extending band sections of the axial action portion include three radially extending band sections.

7. The rotor as defined in claim 1, wherein the spring is made of metal and the apex seal member is made of ceramic.

8. The rotor as defined in claim 1, wherein the radially extending element of the rotor body is an end plate extending adjacent a corresponding one the end faces, each apex seal member having an end with an indentation defined therein forming the radially extending surface contacting the one of the radially extending band sections of the spring and a finger protruding axially from the radially extending surface, the end plate having a slot defined therethrough and the finger being received in the slot.

9. The rotor as defined in claim 2, wherein a distance between the two spaced apart points of contact is from 55% to 75% of a total length of the radial action portion.

10. The rotor as defined in claim 1, wherein the axial action portion extends along 5% to 10% of a total length of the spring.

11. A spring for biasing a seal of a Wankel engine along axial and radial directions thereof, the spring comprising:
   an axial action portion including a first end of the spring and at least two axially spaced apart and radially extending band sections with adjacent ones of the radially extending band sections being connected by a fold;
   a longitudinal portion extending axially from the axial action portion opposite the first end and connected to one of the radially extending band sections by a fold; and
   a radial action portion extending from the longitudinal portion and forming a major part of a length of the spring, the radial action portion including:
      a first section extending from the longitudinal portion and contacting a first plane defined perpendicularly to the radial direction,
      a second section extending from the first section and contacting a second plane parallel to the first plane and radially offset therefrom,
      a third section extending from the second section, the third section being located between the first and second planes and extending without contacting the first and second planes at least when the spring is in a relaxed state,
      a fourth section extending from the third section and contacting the second plane, and
      a fifth section extending from the fourth section and contacting the first plane, the fifth section including the second end.

12. The spring as defined in claim 11, wherein a distance between spaced apart points of contact of the spring with the second plane is from 55% to 75% of a total length of the radial action portion.

13. The spring as defined in claim 11, wherein the axial action portion extends along 5% to 10% of a total length of the spring.

14. The spring as defined in claim 11, wherein the axial action portion intersects the first plane.

15. The spring as defined in claim 11, wherein the at least two radially extending band sections of the axial action portion include three radially extending band sections.

16. The spring as defined in claim 11, wherein each part of the spring contacting the first plane has a rounded shape.

17. A method of sealing chambers of a Wankel engine between apex portions of a rotor of the engine and a peripheral wall of a rotor cavity of an outer body of the engine, the method comprising, for each apex seal member extending from each of the apex portions of the rotor, radially pushing the apex seal member against the peripheral wall with a first section of a spring member, and axially pushing the apex seal member against one of two axially spaced apart end walls of the outer body with a second section of the same spring member distinct from the first section.

18. The method as defined in claim 17, wherein radially pushing each apex seal member includes, for each of the apex portions, radially pushing first and second apex seals with the first section of a respective spring member, and axially pushing each apex seal member includes, for each of the apex portions, axially pushing the first and second apex seals in opposite directions against a respective one of the end walls of the outer body with the second section of the respective spring member.

19. The method as defined in claim 17, wherein radially pushing each apex seal member includes inserting the first section of the spring between an axially extending surface of the apex seal member and the rotor, and axially pushing each apex seal member includes inserting the second section of the spring between radially extending surfaces of the apex seal member and of the rotor.

* * * * *